Patented Apr. 15, 1952

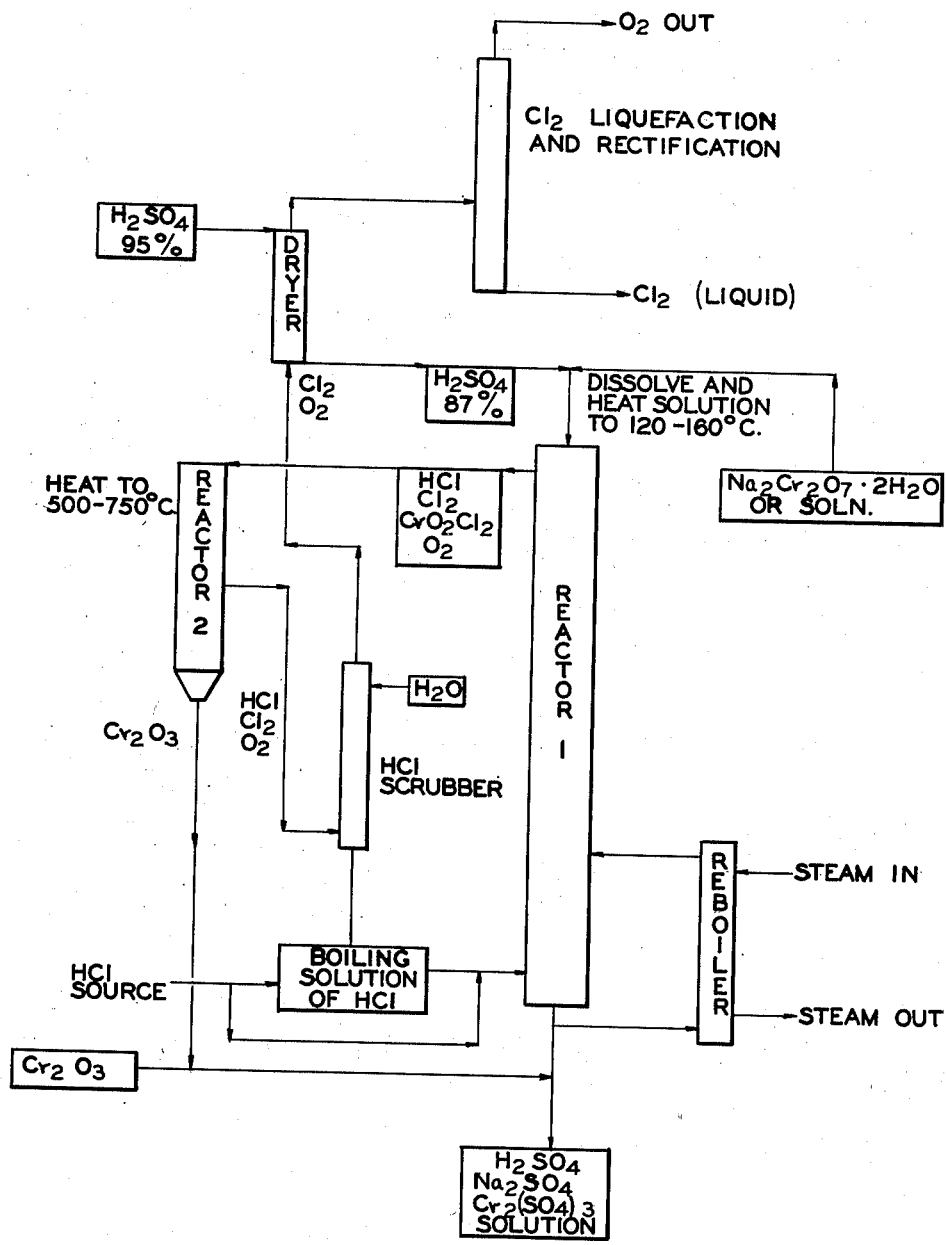

2,592,598

UNITED STATES PATENT OFFICE 2,592,598

PROCESS FOR OBTAINING CHLORINE AND CHROMIUM CONTAINING MATERIALS

Tom S. Perrin, Painesville, Ohio, assignor to Diamond Alkali Company, Cleveland, Ohio, a corporation of Delaware Application April 7, 1949, Serial No. 85,958

6 Claims. (Cl. 23—219)

This invention relates to an integrated, continuous method for the oxidation of hydrogen chloride to chlorine and more particularly relates to a continuous method for the oxidation of hydrogen chloride with the formation of chromyl chloride as an intermediate product, whereby chlorine and oxygen are recovered as gaseous end products and chromic oxide and salts of chromium in solution are recovered as solid or liquid end products. The term "hydrogen chloride," as used herein, is intended to include substantially anhydrous hydrogen chloride gas (HCl) as distinct from vapors evolved from a boiling solution of hydrogen chloride in water, which solution and vapors are referred to herein as hydrochloric acid, the reactant in either case being HCl.

It has heretofore been proposed to oxidize hydrogen chloride in the gas phase with oxygen from the atmosphere and a copper salt as a catalyst to produce chlorine and water. The reaction requires relatively high temperatures and employs a catalyst which is relatively rapidly volatilized at the reaction temperature and must therefore be replenished from time to time as reaction efficiency dictates. Moreover, the yield of chlorine from this process is relatively low and purification problems present themselves in the difficult separation of chlorine from the large volume of nitrogen present in the air which is used for the oxidation.

It has also been proposed heretofore to oxidize chloride salts by contacting such salts with nitrogen peroxide to form nitrosyl chloride as the intermediate product, which intermediate product is subsequently oxidized to nitrogen peroxide and chlorine. Half of the nitrogen peroxide is consumed in the formation of a nitrate salt. The method, of course, requires a relatively economical supply of a suitable halide salt and nitrogen peroxide for its application and is therefore of very limited use in the industrial preparation of chlorine.

It has also been proposed heretofore to prepare chlorine from hydrochloric acid vapors or hydrogen chloride gas by bringing such acid vapors or gas into contact with manganese dioxide or an alkali metal salt of permanganic acid. The cost of preparing manganese dioxide or permanganate salts renders this method of doubtful value for any but laboratory scale production.

Finally, it has been proposed to oxidize chloride salts to chlorine and sulfate salts by employing sulfuric anhydride (SO$_3$). However, the cost of production of this oxidizing agent and the low commercial value of the by-product sulfate salts formed in the reaction also render this method somewhat undesirable from a commercial standpoint.

In contrast to these prior art methods, the method of the present invention provides a process for the manufacture of chlorine and other usable products by utilizing waste hydrogen chloride containing gases, such as those obtained from the chlorination of organic materials, together with impure by-product process solutions obtained in the manufacture of bichromate salts from chrome-bearing ores, or the low-grade impure bichromate salts obtainable from such solutions. A particular advantage obtains in the method of the present invention in that low-grade chromate salts may be employed and simultaneously upgraded to chromium salts of greater commercial value as tanning salts than would the starting materials. Normally in the preparation of tanning salts, high quality bichromate salts are reduced with sulfur dioxide or other gaseous reducing agent, which contributes nothing to the tanning salt composition. However, the method of the present invention utilizes the oxidizing power of bichromate salts in the production of elemental chlorine, while yielding chromic salt compositions suitable for use as tanning salts, all in an integrated, continuous, economical process. Moreover, the other products of the process of the present invention are useful in the chemical arts without further processing to alter their chemical structure, as will be noted from the more detailed discussion hereinafter.

The method of the present invention includes the integrated steps of continuously passing hydrogen chloride or hydrochloric acid vapors in contact with a heated mixture of sulfuric acid and alkali metal bichromate to form a volatile mixture comprising chlorine, chromyl chloride, and oxygen, conducting said mixture to a heated zone, wherein said chromyl chloride is decomposed to solid chromic oxide and a mixture of gaseous oxygen and chlorine, separating the gaseous and solid components issuing from said zone, and continuously separately recovering chlorine and oxygen from said gaseous mixture. The reactions believed to be involved with the above-described method are as follows:

(1) $Na_2Cr_2O_7 \cdot 2H_2O + 6HCl + 4H_2SO_4 =$
$Cr_2(SO_4)_3 + Na_2SO_4 + 9H_2O + 3Cl_2$ (2) $Na_2Cr_2O_7 \cdot 2H_2O + 4HCl + H_2SO_4 =$
$2CrO_2Cl_2 + Na_2SO_4 + 5H_2O$ (3) $2Na_2Cr_2O_7 \cdot 2H_2O + 8H_2SO_4 =$
$2Cr_2(SO_4)_3 + 2Na_2SO_4 + 10H_2O + 3O_2$ (4) $4CrO_2Cl_2$ (at 500°–1000° C.)
$= 2Cr_2O_3 + 4Cl_2 + O_2$ Referring now to the drawing which is attached hereto and forms a part hereof, a flow-sheet of the method of the present invention is shown, in which pieces of apparatus and their inter-relation in the process are represented diagrammatically. Initially, a mixture of sulfuric acid (87% or higher) and sodium bichromate or a solution thereof, is heated, for example, to a temperature within the range of approximately 120° to 160° C. and passed into reactor 1, which may suitably be an unpacked column containing a continuous body of solution but is preferably a packed tower or spray tower, in which the solution of alkali metal bichromate in sulfuric acid is broken up into a discontinuous stream as it passes in countercurrent contact with substantially anhydrous hydrogen chloride gas or the vapors issuing from a boiling solution of hydrochloric acid. When a solution of alkali metal bichromate in sulfuric acid (87% or higher) is passed through reactor 1 in contact with hydrogen chloride or hydrochloric acid vapors, reaction 2 predominates and chromyl chloride is the principal product obtained; while reaction 3 also proceeds to an appreciable extent if the solution temperature is above 150° C., it does so to a lesser extent than 2. However, it has been observed that when a solution of alkali metal bichromate in dilute sulfuric acid (50% or less) is passed through reactor 1 in contact with hydrochloric acid, for example, the vapors issuing from a constant boiling aqueous solution thereof, reaction 2 takes place only to a relatively minor degree, and reaction 1 predominates, possibly for the reason that chromyl chloride is hydrolyzed at the prevailing temperature; a gaseous mixture of chlorine, together with minor amounts of chromyl chloride, oxygen, and unreacted hydrogen chloride, issues from reactor 1.

Where it is desired to produce chromyl chloride as the principal product of the oxidation of HCl, it is preferable to employ a substantial excess of $H_2SO_4$ (conc.) over that required by reaction 2 as a sequestrant for the water formed by this reaction. Ordinarily a two to eight times excess is sufficient. Since the flow of reactants through reactor 1 is continuous, the feed rate of acid bichromate solution thereto is adjusted to the feed rate of HCl thereto, in accordance with the reactions involved in producing the desired end products. For example, if the supply of HCl or hydrochloric acid is variable, it is preferable to co-ordinate the feed rate of acid bichromate solution in accordance with such variation. However, where the supply of HCl or hydrochloric acid is in excess of the supply of bichromate solution available for the process, it is preferable to adjust the feed rate of HCl to the available supply of acid bichromate solution. Moreover, when employing a packed tower as reactor 1, in carrying the method of the present invention into effect, it is preferable to employ the more dilute solutions of bichromate salt in sulfuric acid in reactor 1 so as to prevent crystallization of sodium sulfate therein. Whatever the concentrations of the reactants in their respective solutions may be, it is desirable to provide a source of heat for the solution of reaction products near the solution-effluent end of reactor 1, shown as a "reboiler" in the drawing, in order to assure that appreciable amounts of volatile reactants and reaction products are not carried away in the solution-effluent, whereby the overall conversion factor would be unduly diminished.

The sulfuric acid solution of soluble reaction products issuing from reactor 1 contains, in addition to sulfuric acid employed in excess of that required for the oxidation-reduction reactions, the chromic sulfate and sodium sulfate of reactions 1, 2, and 3 and some unreacted alkali metal bichromate salt. These salts may, if desired, be separately recovered from this mixture, for example, by fractional crystallization. However, it is a particular advantage in the method of the present invention to react a portion of the excess sulfuric acid with the very reactive form of chromic oxide subsequently to be recovered in the process and thereby provide a solution suitable for use as a tanning salt composition for the chrome tanning of leather in that such solution contains the principal ingredients of tanning salt compositions, i. e. chromic sulfate and sodium sulfate. Any residual bichromate values of solution may be reduced, for example, with gaseous sulfur dioxide or metal sulfite salts, or with organic reducing agents, such as reducing sugars present in black strap molasses, prior to final adjustment of the pH of the soluton within the range of 2 to 3.5, which pH range is characteristic of tanning salt solutions. In this manner, the impure by-product bichromate salts which may be employed as one of the raw materials herein are upgraded to more valuable products of commerce and trade then they would be if left to their normal fate as impure low-grade by-products of a bichromate manufacturing process.

The gaseous mixture comprising chlorine, oxygen, chromyl chloride, and some unreacted HCl issuing from reactor 1 is conducted to a second reaction zone (reactor 2 of the drawing), which may suitably include a separator, such as a cyclone separator (not shown in the drawing), for the separation of solid and gaseous reaction products, in which zone the mixture is heated to pyrolysis temperatures of the chromyl chloride, namely within the range of 300° C. to 1000° C., preferably 500°–1000° C. The chromyl chloride is decomposed when heated to a temperature within the range of 500°–1000° C., to gaseous chlorine, oxygen, and a very reactive form of solid chromic oxide. However, when the method of bringing chromyl chloride to pyrolysis temperatures favoring the formation of $Cr_2O_3$, i. e. within the range of 500° to 1000° C. allows the temperature of the chromyl chloride to pass relatively slowly through the range of 300°–500° C., appreciable amounts of an oxide of chromium believed to be $Cr_5O_9$, or $2Cr_2O_3 \cdot CrO_3$, is formed. The chromium oxide which forms from the decomposition of chromyl chloride within this range is a substance having a high degree of chemical inertness, hard, dense, and strongly magnetic, and hence may be readily separated from the $Cr_2O_3$ by either chemical or physical means. It is probable that other oxide congeners are also formed simultaneously with the $Cr_5O_9$ compound and that therefore the material obtained represents a mixture of $Cr_2O_3$ and the other congeneric oxides of chromium. There are discernible fractions of the chromium oxide obtained, however, characterized in part by chemical reactivity and physical properties. Oxygen and chromic oxide at these temperatures, in contact with the unreacted hydrogen chloride issuing from reactor 1, tends to decompose such hydrogen chloride with the formation of further quantities of chlorine and water vapor. The solid and gaseous products of these reactions may be separated in any suitable mechanism, such as the cyclone separator, noted above includes as part of reactor 2 of the drawing but not shown therein, and the gaseous products passed to a tower, wherein they are scrubbed with water to remove any unreacted hydrogen chloride which may be present. Solid chromic oxide is also recovered from the separator of reactor 2 and may be produced as such or combined with the aqueous sulfuric acid effluent from reactor 1, as noted hereinabove. The gaseous effluent from the scrubber may be subsequently passed through a drying tower, such as that indicated in the drawing, wherein the gases pass in countercurrent contact with relatively concentrated sulfuric acid. Finally, the gases are sent to liquefying and rectification equipment, wherein liquid chlorine and oxygen may be separately recovered.

Where alkali metal bichromates are referred to, it will be understood that lithium, potassium, sodium, rubidium, or cesium bichromates are included. In view of economic considerations sodium bichromates are usually preferred.

In order that those skilled in the art may better understand the method of the present invention and in what manner the same may be carried into effect, the following specific examples are offered:

Example 1

Substantially anhydrous hydrogen chloride gas is fed to a reactor, wherein it passes countercurrent to a solution of sodium bichromate in 95% sulfuric acid. The solution contains 12% of $Na_2Cr_2O_7 \cdot 2H_2O$ and 88% of 95% sulfuric acid. The temperature of the solution during the contact with the anhydrous hydrogen chloride is maintained substantially within the range of 125° to 135° C. A portion of the effluent gases containing chromyl chloride issuing from the reactor during the reaction period is collected; based on the weight of chromyl chloride therein, the conversion of bichromate to chromyl chloride is of the order of 78%. The effluent gases from this reactor are passed in contact with heated surfaces in a second reactor having means for the separation of the gaseous products from the solid products of the decomposition, the surfaces having been heated to a temperature of the order of 540° C. A portion of the gases issuing from the reactor is absorbed in a concentrated solution of caustic soda and the analysis of the caustic soda solution shows that 93.9% of the chromyl chloride has been decomposed in accordance with reaction 4 above.

Example 2

A body of solution of hydrogen chloride and water containing approximately 30% of hydrogen chloride is heated to boiling in a suitable chamber and the vapors issuing from the boiling chamber are passed in contact with a solution of sodium bichromate dihydrate in concentrated sulfuric acid of the same composition as that employed in Example 1. The solution of sodium bichromate in sulfuric acid is maintained substantially within the range of 140° to 150° C. and the gaseous mixture issuing from the reactor is found to contain unreacted hydrogen chloride gas, chlorine, and chromyl chloride; this gaseous mixture is then passed to a heated zone maintained at a temperature of the order of 540° to 700° C. Analysis of the gases issuing from the reactor shows that the conversion of bichromate salt to chromyl chloride is about 69% based on the weight of hydrogen chloride fed to the reactor; the yield of free chlorine from the chromyl chloride conducted to the heated zone is 86%.

Example 3

A body of by-product bichromate liquor (sp. gr. 1.690), obtained in the manufacture of bichromate salts from chrome-bearing ores, containing 1160 gms. of $Na_2Cr_2O_7 \cdot 2H_2O$ per liter, is mixed with sulfuric acid (95%) in an amount of about 2.5 times the weight of the bichromate liquor and this mixture is then heated and maintained within the temperature range of 110° to 120° C. Hydrochloric acid vapors from a boiling mixture of HCl and water, corresponding very nearly to the composition of a constant boiling mixture thereof, are passed in countercurrent contact with the heated mixture of sulfuric acid and bichromate liquor with the following results (based on the weight of bichromate salt fed to the reactor):

Chromyl chloride, 3.5% of theoretical

Cr (hexavalent reduced by oxidizing HCl to chlorine, 85.6% of theoretical

The vapor mixture of chlorine and chromyl chloride is conducted to a second reactor, as in Examples 1 and 2, to decompose the chromyl chloride to chlorine, oxygen, and chromic oxide. The gaseous products issuing from the second reactor are passed in countercurrent contact with a stream of water, dried, and separately recovered. The wash solution from the scrubber is returned to the boiling solution of HCl in water.

As illustrative of conditions allowing the formation of appreciable amounts of the oxide $Cr_5O_9$ or $2Cr_2O_3 \cdot CrO_3$, and congeners thereof, in the pyrolysis of chromyl chloride, the following is a specific example:

Example 4

A quartz tube packed with pieces of pumice is inserted in an electric tube heating furnace so as to extend substantially beyond the limits of the furnace. Thus placed, the open ends of the tube are stoppered and vapor inlet and outlet tubes inserted in the stoppers. Chromyl chloride vapors are fed at a relatively slow rate through the vapor inlet tube to the pumice filled quartz tube, heated to approximately 860° C. (measured by a bimetallic thermocouple next to the outside surface of the quartz tube), chromic oxide ($CR_2O_3$) is deposited upon the pumice in the hottest portion of the tube, and a hard, dense, chemically inert, strongly magnetic chromium oxide (believed to be principally $Cr_5O_9$) deposits on the interior surfaces thereof in the region where the tube enters the heating zone of the furnace. This chromium oxide material appears to fuse and to adhere to the pumice pieces and the interior surface of the quartz tube. (The yield of chlorine is not materially less than that obtained in the previous examples.) Further, this material possesses chemical and physical properties, particularly its chemical inertness, which render it suitable for use as a refractory. For example, acidic substances, such as strong acids, aqua regia, and the like, do not attack it appreciably and strong aqueous alkalies, when hot, attack it only very slowly.

While there have been described in detail certain forms of the invention and embodiments of its practice, the invention is not to be understood as being limited to the detailed disclosure as it is

What is claimed is:

1. The integrated continuous method for producing chlorine, oxygen, and chromium compounds, which includes the steps of continuously mixing sulfuric acid and alkali metal bichromate, heating said mixture to a temperature within the range of 120° to 160° C., passing hydrogen chloride in contact with said mixture to form a second mixture comprising chlorine, chromyl chloride, and oxygen, heating said second mixture to the decomposition temperature of chromyl chloride to decompose said chromyl chloride to solid chromium oxide, gaseous oxygen, and chlorine, and continuously separately recovering chlorine, oxygen, and chromium oxide from said second mixture.

2. The integrated continuous method for producing chlorine, oxygen, and chromium compounds, which includes the steps of continuously mixing sulfuric acid and alkali metal bichromate, heating said mixture to a temperature within the range of 120° to 160° C., passing hydrogen chloride in countercurrent contact with said mixture to form a second mixture comprising chlorine, chromyl chloride, and oxygen, heating said second mixture to the decomposition temperature of chromyl chloride to decompose said chromyl chloride to solid chromium oxide and a gaseous mixture of oxygen and chlorine, separating the solid and gaseous components thus formed, and continuously separately recovering chlorine, oxygen, and chromium oxide.

3. The integrated continuous method for producing chlorine, oxygen, and chromic compounds which includes the steps of continuously mixing sulfuric acid and alkali metal bichromate, heating said mixture to a temperature within the range of 120° to 160° C., passing hydrogen chloride in countercurrent contact with said mixture to form a second mixture comprising chlorine, chromyl chloride, and oxygen, heating said second mixture to the decomposition temperature of chromyl chloride to decompose said chromyl chloride to solid chromic oxide and a gaseous mixture of oxygen and chlorine, separating the solid and gaseous components, passing the gaseous components in countercurrent contact with a stream of water to remove the water soluble portion from said gaseous components, withdrawing the remaining gaseous materials from contact with said stream of water, and continuously separately recovering chlorine and oxygen from the washed gaseous materials.

4. The integrated continuous method for producing chlorine, oxygen, and chromic compounds, which includes the steps of continuously mixing sulfuric acid and alkali metal bichromate, heating said mixture to a temperature within the range of 120° to 160° C., passing hydrochloric acid vapors in countercurrent contact with a discontinuous stream of said mixture to form a second mixture comprising chlorine, chromyl chloride, and oxygen, heating said second mixture to the decomposition temperature of chromyl chloride to decompose the same to solid chromic oxide and a gaseous mixture of chlorine and oxygen, separating the solid and gaseous components, passing said gaseous components in countercurrent contact with a stream of water to dissolve water soluble components including hydrochloric acid from said mixture, recycling said hydrochloric acid to the source of said hydrochloric acid vapors, and continuously separately recovering chlorine and oxygen from the washed gaseous mixture.

5. The integrated continuous method for producing chlorine, oxygen, and chromic compounds, which includes the steps of continuously mixing sulfuric acid and alkali metal bichromate, heating said mixture to a temperature within the range of 120° to 160° C., passing hydrochloric acid vapors in countercurrent contact with a discontinuous stream of said mixture to form a second mixture comprising chlorine, chromyl chloride, and oxygen, heating said second mixture to a temperature within the range of 500° to 750° C. to decompose said chromyl chloride to solid chromic oxide and a gaseous mixture of chlorine and oxygen, separating the gaseous and solid components, passing said gaseous mixture in countercurrent contact with a stream of water to dissolve water soluble components from said mixture, withdrawing said gaseous mixture from contact with said stream of water, recycling said stream of water to the source of said hydrochloric acid vapors, and continuously separately recovering chlorine and oxygen from the washed gaseous mixture.

6. The integrated continuous method for producing chlorine, oxygen, and chromic compounds, which includes the steps of continuously mixing sulfuric acid and alkali metal bichromate, heating said mixture to a temperature within the range of 120° to 160° C., passing hydrochloric acid vapors in countercurrent contact with a discontinuous stream of said mixture to form a second mixture comprising chlorine, chromyl chloride, and oxygen, heating said second mixture to a temperature within the range of 300° to 500° C. to decompose said chromyl chloride to a mixture of solid chromium oxides including $Cr_2O_3$ and $Cr_5O_9$, separating the gaseous and solid components, and separately recovering said mixture of oxides.

TOM S. PERRIN.

REFERENCES CITED

The following references are of record in the file of this patent:

McPherson and Henderson, "A Course in General Chemistry," 3rd. ed., page 660. Ginn & Co., N. Y., publishers.

J. W. Mellor, "A Comprehensive Treatise on Inorganic and Theoretical Chemistry," vol. 11, 1931 ed., pages 392, 394. Longmans, Green & Co., N. Y., publishers.